United States Patent
Yang et al.

(10) Patent No.: US 11,455,322 B2
(45) Date of Patent: Sep. 27, 2022

(54) CLASSIFICATION OF TIME SERIES DATA

(71) Applicant: International Business Machines Corporation, Armonk, NY (US)

(72) Inventors: Xiang Yu Yang, Xi'an (CN); Deng Xin Luo, Xi'an (CN); Jing Du, Beijing (CN); Zhong Fang Yuan, Xi'an (CN); Tong Liu, Xi'an (CN); Li Jia Lu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 16/872,549

(22) Filed: May 12, 2020

(65) Prior Publication Data
US 2021/0357431 A1 Nov. 18, 2021

(51) Int. Cl.
*G06F 17/00* (2019.01)
*G06F 16/28* (2019.01)
(Continued)

(52) U.S. Cl.
CPC ............ *G06F 16/285* (2019.01); *G06F 16/56* (2019.01); *G06F 16/9024* (2019.01);
(Continued)

(58) Field of Classification Search
None
See application file for complete search history.

(56) References Cited

U.S. PATENT DOCUMENTS

| 7,124,055 | B2 | 10/2006 | Breiman |
| 7,925,663 | B2 * | 4/2011 | Napper ................. G06F 16/50 707/769 |

(Continued)

FOREIGN PATENT DOCUMENTS

| CN | 103020643 B | 5/2015 |
| CN | 104182771 B | 4/2017 |

(Continued)

OTHER PUBLICATIONS

Liao et al., Image retrieval method based on target positioning, Chinese Patent Publication No. CN 110347854 A, dated Oct. 18, 2019 (Year: 2019).*

(Continued)

*Primary Examiner* — Hasanul Mobin
(74) *Attorney, Agent, or Firm* — Stosch Sabo

(57) ABSTRACT

Described are techniques for determining statistical properties of time series data. The techniques include a method comprising graphing, from time series data, a time series data graph. The method further comprises iteratively segmenting the time series data graph into respective pluralities of subgraphs using respective segmentation schemes until a first plurality of subgraphs generated by a first segmentation scheme exhibits a similarity between respective subgraphs of the first plurality of subgraphs satisfying a similarity threshold. The first segmentation scheme can be selected from: an equidistant segmentation scheme, a local extrema segmentation scheme, and a windowed segmentation scheme. The method further comprises associating a classification to the time series data based on the first segmentation scheme. The classification can be indicative of one selected from: stationarity of the time series data, periodicity of the time series data, and trending of the time series data.

20 Claims, 8 Drawing Sheets

(51) Int. Cl.
*G06F 16/901* (2019.01)
*G06N 20/00* (2019.01)
*G06Q 30/04* (2012.01)
*G06Q 20/14* (2012.01)
*G06F 16/56* (2019.01)

(52) U.S. Cl.
CPC ........... *G06N 20/00* (2019.01); *G06Q 20/145* (2013.01); *G06Q 30/04* (2013.01)

(56) References Cited

U.S. PATENT DOCUMENTS

| | | | | |
|---|---|---|---|---|
| 2007/0208497 | A1* | 9/2007 | Downs | G08G 1/0104 701/117 |
| 2008/0319951 | A1* | 12/2008 | Ueno | G06F 16/285 707/E17.046 |
| 2010/0125664 | A1* | 5/2010 | Hadar | G06Q 10/06393 709/227 |
| 2014/0156518 | A1* | 6/2014 | Kibler | G06F 9/5072 705/40 |
| 2015/0112900 | A1* | 4/2015 | Ariyoshi | G06N 20/00 706/46 |
| 2015/0170055 | A1* | 6/2015 | Beymer | G06N 20/00 706/12 |
| 2016/0321265 | A1* | 11/2016 | Cevahir | G06F 16/24578 |
| 2018/0046926 | A1* | 2/2018 | Achin | G06N 20/20 |
| 2019/0108460 | A1* | 4/2019 | Chien | G06Q 10/063 |
| 2019/0286070 | A1* | 9/2019 | Luo | G05B 23/0272 |
| 2019/0392252 | A1* | 12/2019 | Fighel | G06K 9/6222 |
| 2020/0134510 | A1* | 4/2020 | Basel | G06N 3/084 |
| 2021/0181336 | A1* | 6/2021 | Tanaka | G01S 13/9027 |

FOREIGN PATENT DOCUMENTS

| | | |
|---|---|---|
| JP | 2005031908 A | 2/2005 |
| JP | 3977782 B2 | 9/2007 |
| JP | 2012247991 A | 12/2012 |

OTHER PUBLICATIONS

Lee et al., "Time Series Segmentation through Automatic Feature Learning", Jan. 26, 2018, 14 pages.

Santos et al., "A Literature Survey of Early Time Series Classification and Deep Learning", Saml40 workshop at i-KNOW '16, Oct. 18-19, 2016, 7 pages.

Mell et al., "The NIST Definition of Cloud Computing", Recommendations of the National Institute of Standards and Technology, Sep. 2011, 7 pages.

* cited by examiner

CLASSIFICATION OF TIME SERIES DATA

BACKGROUND

The present disclosure relates to data analytics, and, more specifically, to classifying time series data.

Time series data is common in industries such as retail, e-commerce, and industrial fields, among others. One data analytics application of time series data relates to time series prediction whereby future values are predicted from a historical set of time series data. Effective time series prediction can realize improved efficiencies for a variety of applications.

SUMMARY

Aspects of the present disclosure are directed toward a computer-implemented method comprising graphing, from time series data, a time series data graph. The method further comprises iteratively segmenting the time series data graph into respective pluralities of subgraphs using respective segmentation schemes until a first plurality of subgraphs generated by a first segmentation scheme exhibits a similarity between respective subgraphs of the first plurality of subgraphs satisfying a similarity threshold. The first segmentation scheme can be selected from a first group consisting of: an equidistant segmentation scheme, a local extrema segmentation scheme, and a windowed segmentation scheme. The method further comprises associating a classification to the time series data based on the first segmentation scheme. The classification can be indicative of one selected from a second group consisting of: stationarity of the time series data, periodicity of the time series data, and trending of the time series data.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
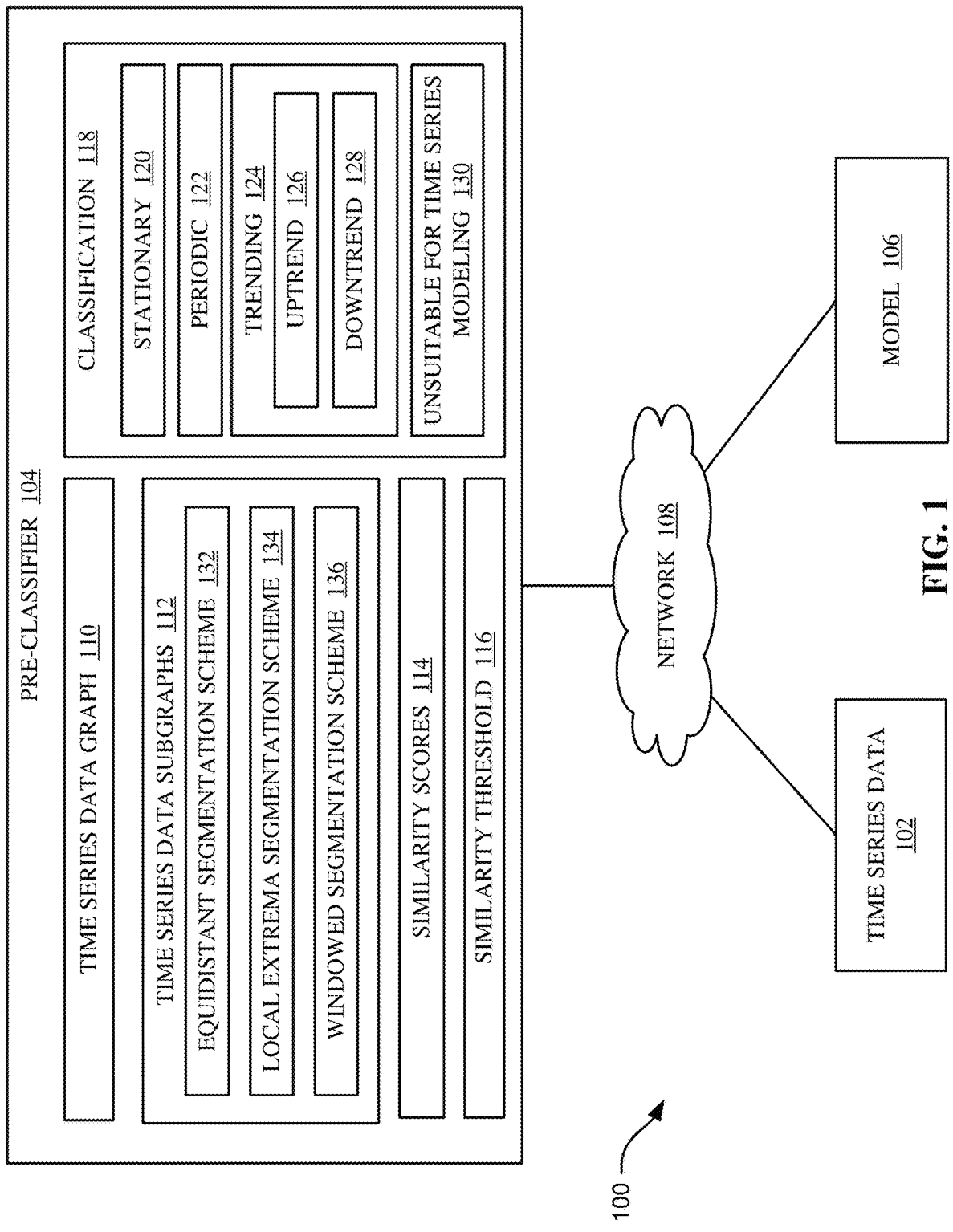
FIG. 1 illustrates a block diagram of an example computational environment, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward data analytics, and more specifically, to classifying time series data. While not limited to such applications, embodiments of the present disclosure may be better understood in light of the aforementioned context.

Time series data sets can be notoriously large. Thus, analyzing time series data sets can be time-consuming. Traditionally, time series data sets may be fed to a machine learning model with little understanding of any characteristics of the time series data. For example, time series data can exhibit characteristics such as stationarity (e.g., stable, etc.), periodicity (e.g., cyclical, seasonal, etc.), trending (e.g., downtrend, uptrend, etc.) and others. Furthermore, some time series data exhibits none of the aforementioned characteristics, thus making it difficult or impossible to accurately perform the prediction of future values. Accordingly, performing predictive modeling of a time series data set without some understanding of the characteristics of the time series data set is inefficient. For example, numerous iterations of types of models and/or numerous iterations of parameters within a same type of model may be required in order to accurately capture characteristics in the given time series data such as periodicity or trending characteristics.

In contrast, determining characteristics such as stationarity, periodicity, trending, and others in the given time series data set prior to selecting a type of model and tuning its associated parameters can improve efficiency in training the model and improve the accuracy of the predictions generated by the trained model. Accordingly, aspects of the present disclosure are directed toward techniques for pre-classifying time series data in order to improve the efficiency of generating predictive models for the time series data and/or for improving the accuracy of the predictions generated by predictive models trained on the time series data.

Referring now to FIG. 1, illustrated is a computational environment 100 for modeling time series data. The computational environment 100 can include time series data 102, a pre-classifier 104, and a model 106 communicatively coupled to one another by a network 108. Although a single network 108 is shown, network 108 can be representative of any number of permanent or intermittent wired or wireless connections between any two or more of the time series data 102, pre-classifier 104, and model 106. Furthermore, although time series data 102, pre-classifier 104, and model 106 are shown separately, in other embodiments, two or more of the aforementioned components can be incorporated into one another. For example, in some embodiments, the pre-classifier 104 and model 106 can be incorporated into a same physical product (e.g., a tangible computer-readable storage medium storing the pre-classifier 104 and the model 106) or a virtually provisioned instantiation of a physical product (e.g., a cloud-based data analytics platform, deep learning platform, machine learning platform, or another platform related to data analysis).

The time series data 102 can be a sequence of discrete-time data. Said another way, time series data 102 can be any type of data indexed by time. Time series data 102 can include real-valued data, continuous data, discrete numeric data, discrete symbolic data, and/or other types of data. Although time series data 102 is illustrated as a single entity, in some embodiments, time series data 102 is representative of data received from a plurality of sources.

Pre-classifier 104 is configured to ingest the time series data 102 and classify the time series data 102 for purposes of improving the selection of, training of, and/or deployment of model 106. Pre-classifier 104 can generate a time series data graph 110 corresponding to the time series data 102. The time series data graph 110 can be, for example, a graph of the time series data 102 (e.g., where time is on the x-axis and a metric associated with the time series data 102 is on the y-axis). In other embodiments, the time series data graph 110 can be a vector, matrix, or tensor of the time series data 102.

The pre-classifier 104 can segment the time series data graph 110 to generate time series data subgraphs 112. The pre-classifier 104 can segment the time series data graph 110 according to various segmentation schemes such as, for example, (i) an equidistant segmentation scheme 132 utilizing equally sized intervals along the temporal axis beginning with a first data point in the time series data 102; (ii) a local extrema segmentation scheme 134 utilizing equal or unequal segments along the temporal axis, where the segments are partitioned according to local extrema values such as peaks (e.g., local maxima) and/or troughs (e.g., local minima) in the time series data 102; and/or (iii) a windowed segmentation scheme 136 utilizing equally or unequally sized windows generated by vertical partitions and horizontal partitions. Respective horizontal partitions and vertical partitions of the windowed segmentation scheme 136 can be either equidistant or variable. When variable, respective horizontal partitions and/or vertical partitions can be configured for other scales such as logarithmic or exponential scales in order to capture corresponding logarithmic or exponential characteristics of the underlying time series data graph 110.

Each of the segmentation schemes can be associated with a corresponding classification 118. In other words, if a given segmentation scheme successfully characterizes the time series data graph 110, the time series data 102 can subsequently be associated with the classification 118 corresponding to the given segmentation scheme. For example, the equidistant segmentation scheme 132 can be associated with a classification 118 of stationary 120. The local extreme segmentation scheme 134 can be associated with a classification 118 of periodic 122. The windowed segmentation scheme 136 can be associated with a classification 118 of trending 124, and, in some embodiments, a sub-classification of uptrend 126 or downtrend 128. If none of the segmentation schemes successfully characterizes the time series data graph 110, then the time series data 102 can be associated with a classification 118 of unsuitable for time series modeling 130.

In order to determine which segmentation scheme successfully characterizes the time series data 102 and subsequently associate the corresponding classification 118 to the time series data 102, the pre-classifier 104 can calculate similarity scores 114 between respective time series data subgraphs 112 generated by a given segmentation scheme. In various embodiments, the pre-classifier 104 can calculate a single similarity score 114 for each respective time series data subgraph 112, where the single similarity score 114 characterizes the similarity of the respective time series data subgraph 112 to a subsequent subgraph, one or more other subgraphs, or all of the other subgraphs. In other embodiments, multiple similarity scores 114 or generated for each respective time series data subgraph 112, where the multiple similarity scores 114 can quantify the similarity between a respective time series data subgraph 112 and two or more other time series data subgraphs 112. In some embodiments, one of the similarity scores 114 is an average similarity score, where the average similarity score accounts for a plurality of similarity scores 114 reflecting respective similarities between respective time series data subgraphs 112 and one or more other time series data subgraphs 112.

The similarity scores 114 can be based on a variety of techniques and methodologies for quantifying similarity between respective time series data subgraphs 112. For example, in some embodiments, the similarity scores 114 are quantified based on image similarity, where images of the time series data subgraphs 112 are compared to one another, and the similarity score 114 is calculated based on a comparison of similarities and differences between the images of the time series data subgraphs 112. In some embodiments, determining image similarity is based on image feature vectors of the respective subgraphs. An image feature vector can characterize an image based on one or more features. For example, an image feature vector can characterize an image by storing a value (e.g., brightness, hue, Red Green Blue (RGB) tuple, saturation, etc.) for each pixel (or a predetermined subset of pixels) in a given image. Feature vectors can be combined into matrices or tensors for embodiments comparing the similarity between subgraphs on the basis of multiple features. Accordingly, the similarity between two subgraphs can be determined by comparing respective feature vectors of the two subgraphs. This degree of similarity can be quantified by, for example, a cosine similarity score. Although cosine similarities are discussed above, any number of alternative similarity metrics are also possible such as but not limited to, the Tanimoto coefficient, the Otsuka-Ochiai coefficient, the Sorensen-Dice coefficient, the Hamming distance, the Jaccard Index (or Jaccard similarity coefficient), and/or other techniques for quantifying similarity between time series data 102 now known or later developed.

The pre-classifier 104 can compare the similarity scores 114 to a similarity threshold 116. For similarity scores 114 satisfying the similarity threshold 116, the time series data 102 can be classified according to the classification 118 corresponding to the segmentation scheme successfully characterizing the time series data graph 110 (e.g., stationary 120, periodic 122, and trending 124 where trending 124 can include a sub-classification of uptrend 126 or downtrend 128).

In some embodiments, the pre-classifier 104 iteratively cycles through segmentation schemes until one of the segmentation schemes generates a similarity score 114 that satisfies the similarity threshold 116. In other embodiments, the pre-classifier 104 concurrently generates the time series data subgraphs 112 and then selects the largest similarity score 114 if two or more similarity scores 114 for respective segmentation schemes satisfy the similarity threshold 116.

For situations where no similarity scores 114 of any segmentation scheme satisfies the similarity threshold 116, the pre-classifier 104 can associate a classification 118 of unsuitable for time series modeling 130 to the time series data 102.

Classification 118 of stationary 120 is indicative of data that exhibits stationarity or stability. The classification 118 of periodic 122 is indicative of data that exhibits periodicity or seasonality. In other words, periodic 122 refers to repetitive cycles of peaks and/or troughs in the time series data 102. The classification 118 of trending 124 refers to time series data 102 that is increasing (e.g., uptrend 126) or decreasing (e.g., downtrend 128). In some embodiments, classification 118 of trending 124 can also capture the rate of the trend, such as stable, accelerating, or decelerating. For example, an accelerating trend can re indicative of an exponential function, whereas a decelerating trend can be indicative of a logarithmic function.

Model 106 can be selected based on the classification 118 associated with the time series data 102. Model 106 is configured to ingest the time series data 102 and output one or more predicted future values of time series data 102. In some embodiments, the classification 118 is supplied to the model 106. For example, the model 106 may be tuned according to the classification 118 of the time series data 102 so that the model 106 is able to efficiently train on the time series data 102 and accurately predict one or more future values of the time series data 102. In other embodiments, the model 106 is selected based on the classification 118 of the time series data 102. For example, the model 106 can be a model that is adapted for the classification 118 of time series data 102 insofar as some models 106 are relatively better suited for stationary 120 data, periodic 122 data, or trending 124 data. Thus, an awareness of the classification 118 of the time series data 102 can enable the selection of model 106, thereby contributing to improved efficiency (e.g., in training) and/or accuracy (e.g., in prediction) of the model 106.

Figure 2:
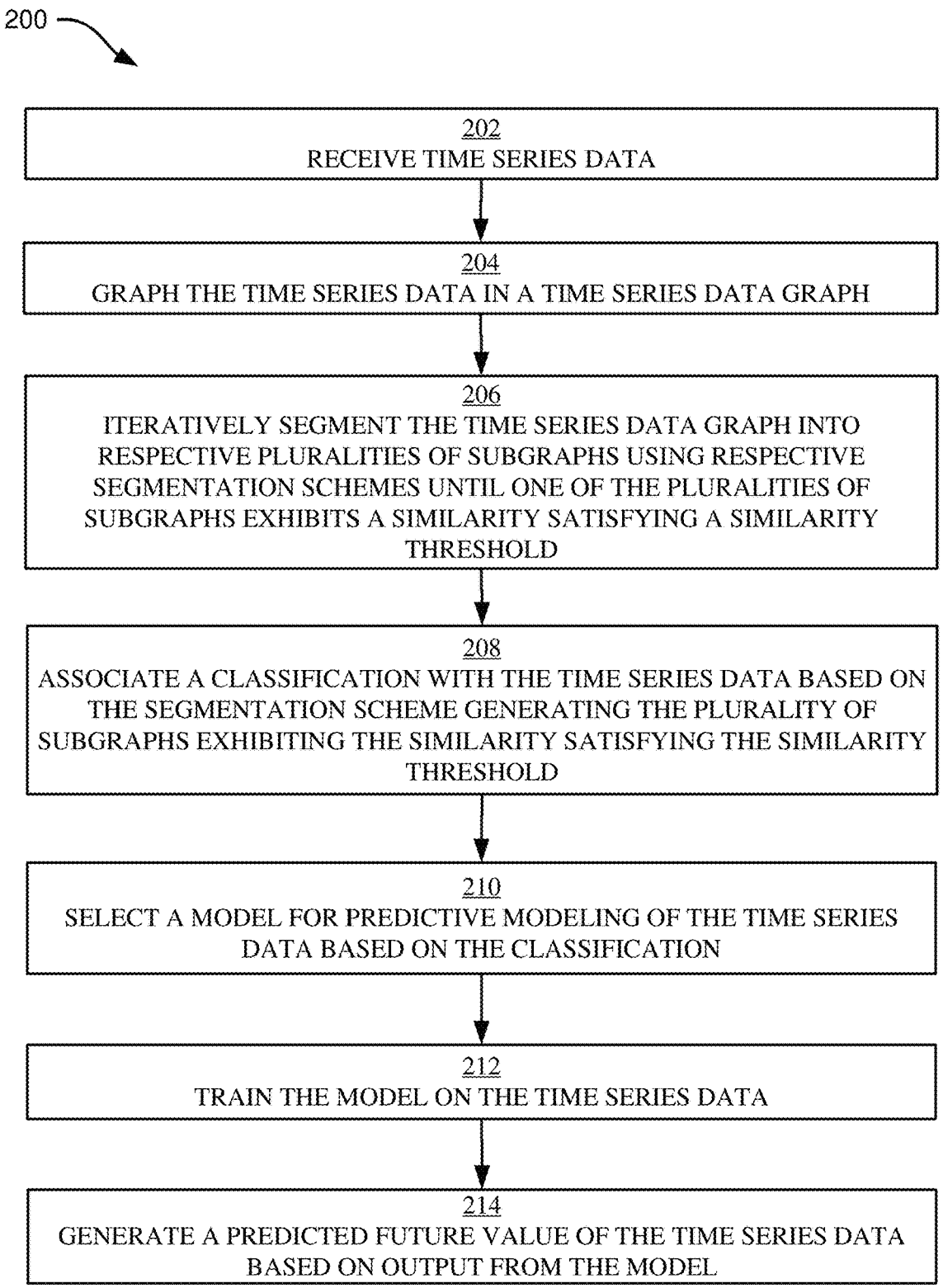
FIG. 2 illustrates a flowchart of an example method for utilizing a pre-classifier for predictive modeling of time series data, in accordance with some embodiments of the present disclosure.

FIG. 2 illustrates a flowchart of an example method 200 for utilizing a pre-classifier 104 during predictive modeling of time series data 102, in accordance with some embodiments of the present disclosure. In some embodiments, method 200 is performed by one or more components of a computational environment 100, a computer, a processor, and/or another configuration of hardware and/or software.

Operation 202 includes receiving time series data 102 at a pre-classifier 104. Operation 204 includes graphing the time series data 102 into a time series data graph 110. Operation 206 includes iteratively segmenting the time series data graph 110 into respective pluralities of subgraphs 112 using respective segmentation schemes until one of the pluralities of subgraphs 112 exhibits a similarity score 114 that satisfies a similarity threshold 116. In some embodiments, the segmentation schemes comprise one or more of the equidistant segmentation scheme 132, the local extrema segmentation scheme 134, and/or the windowed segmentation scheme 136.

Operation 208 includes associating a classification 118 to the time series data 102 based on the segmentation scheme generating the plurality of subgraphs 112 exhibiting the similarity score 114, satisfying the similarity threshold 116. Operations 206 and 208 are discussed in more detail hereinafter with respect to FIG. 3.

Operation 210 includes selecting a model 106 for performing predictive time series modeling of the time series data 102, where the model 106 is selected based, at least in part, on the classification 118. In some embodiments, operation 210 includes selecting a model 106 that is configured for, adapted for, or suitable for, data characteristics consistent with the classification 118.

Operation 212 includes training the model 106 on the time series data 102. In some embodiments, operation 212 further includes tuning the model 106 based on the classification 118, where the tuning can involve adding, removing, or refining parameters or otherwise modifying the configuration of the model 106 based on the classification 118 of the time series data 102.

Operation 214 includes generating a predicted future value of the time series data 102 based on output from the model 106. Operation 214 can generate predictions that are applicable to any number of applications such as financial applications, e-commerce applications, meteorological applications, sporting event applications, logistical applications, Internet of Things (IoT) applications, and/or other applications involving the analysis of time series data 102 and forecasting of one or more future data points.

Figure 3:
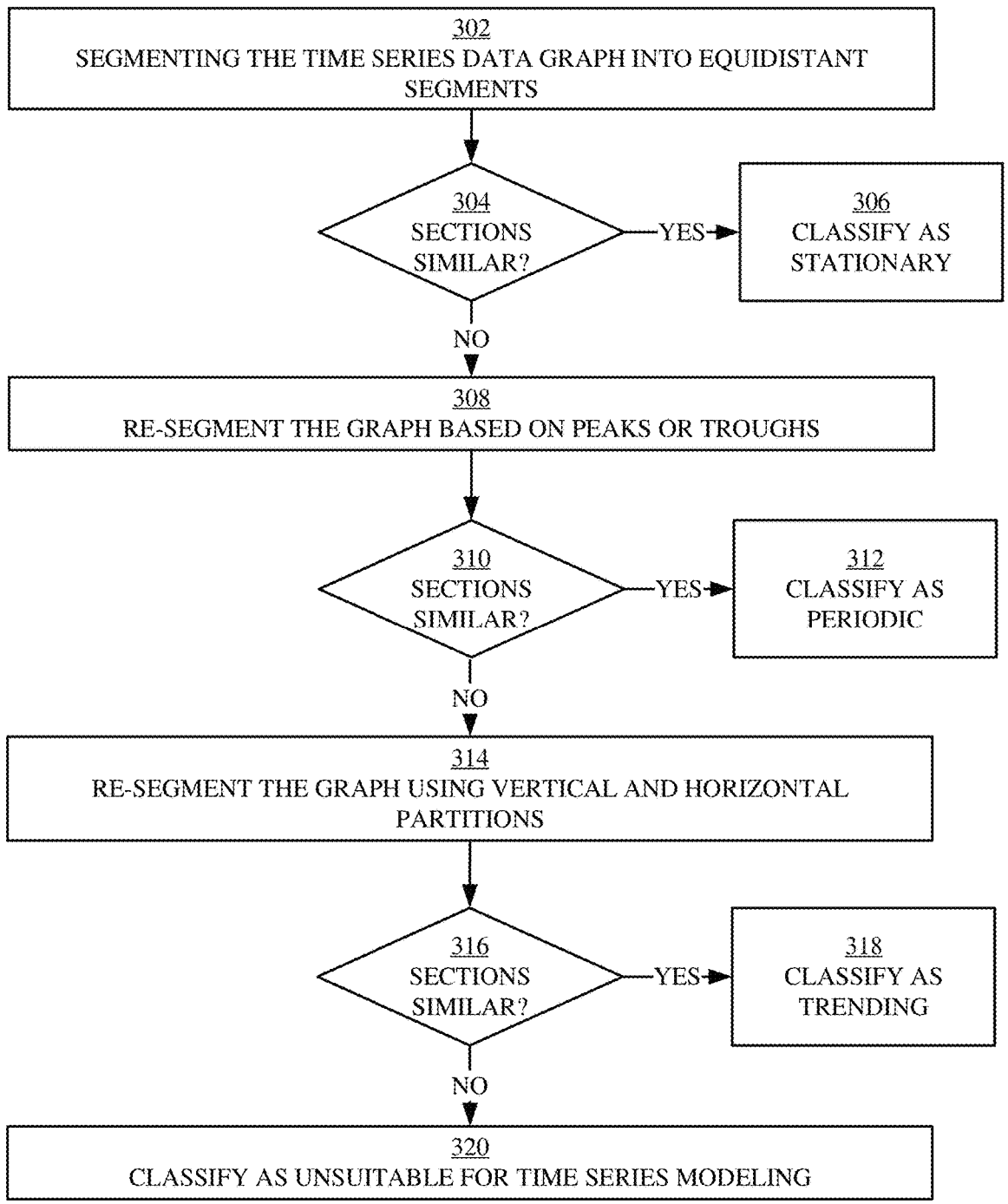
FIG. 3 illustrates a flowchart of an example method for classifying time series data, in accordance with some embodiments of the present disclosure.

FIG. 3 illustrates a flowchart of an example method 300 for associating a classification 118 to time series data 102, in accordance with some embodiments of the present disclosure. In some embodiments, method 300 is performed by one or more components of a computational environment 100, a computer, a processor, and/or another configuration of hardware and/or software. In some embodiments, the method 300 is a sub-method of operations 206 and 208 of FIG. 2.

Operation 302 includes segmenting the time series data graph 110 into time series data subgraphs 112, where the time series data subgraphs 112 are segmented according to the equidistant segmentation scheme 132.

Operation 304 includes determining if respective segments of the time series data subgraphs 112 are sufficiently similar. In some embodiments, operation 304 includes calculating one or more similarity scores 114 associated with the time series data subgraphs 112 and comparing the one or more similarity scores 114 to a similarity threshold 116.

If the respective segments of the time series data subgraphs 112 are sufficiently similar (304: YES), the method 300 can proceed to operation 306 and associate a classification 118 of stationary 120 to the time series data 102. If the respective segments of the time series data subgraphs 112 are not sufficiently similar (304: NO), then the method 300 can proceed to operation 308.

Operation 308 includes re-segmenting the time series data graph 110 according to the local extrema segmentation scheme 134. For example, if a fiftieth data point is a peak (or trough), then operation 308 can partition the time series data graph 110 in increments of fifty. However, in various embodiments, any incrementing scheme can be used that is based, at least partially, on a local maximum or local minimum, such as an increment including ten data points after a local maximum or local minimum (e.g., increments of sixty using the above example).

Operation 310 includes determining if respective segments of the re-segmented time series data subgraphs 112 are sufficiently similar. In some embodiments, operation 310 includes calculating one or more similarity scores 114 associated with the re-segmented time series data subgraphs 112 and comparing the one or more similarity scores 114 to a similarity threshold 116.

If the respective segments of the re-segmented time series data subgraphs 112 are sufficiently similar (310: YES), the method 300 can proceed to operation 312 and associate a classification 118 of periodic 122 to the time series data 102. If the respective segments of the re-segmented time series data subgraphs 112 are not sufficiently similar (310: NO), then the method 300 can proceed to operation 314.

Operation 314 includes re-segmenting the time series data graph 110 using the windowed segmentation scheme 136. In some embodiments, operation 316 includes re-segmenting the time-series data graph 110 using equidistant temporal partitions (e.g., equidistant partitions along the x-axis) and equidistant metric partitions (e.g., equidistant partitions along the y-axis). Here, the term "equidistant" can refer to equal partitions for each respective axis. Thus, the term "equidistant" does not necessarily refer to equally sized partitions between the axes. Accordingly, the re-segmented time series data subgraphs 112 include a plurality of rectangular windows capturing respective segments of the x-axis and respective segments of the y-axis. Furthermore, as previously discussed, the horizontal and/or vertical partitions need not necessarily be equidistant at all but can conform to other scales (e.g., exponential, logarithmic, etc.).

Operation 316 includes determining if respective segments of the re-segmented time series data subgraphs 112 are sufficiently similar. In some embodiments, operation 316 includes calculating one or more similarity scores 114 associated with the re-segmented time series data subgraphs 112 and comparing the one or more similarity scores 114 to a similarity threshold 116.

If the respective segments of the re-segmented time series data subgraphs 112 are sufficiently similar (316: YES), the method 300 can proceed to operation 318 and associate a classification 118 of trending 124 to the time series data 102. In some embodiments, operation 318 further includes classifying the time series data 102 as an uptrend 126 or downtrend 128 as discussed in more detail hereinafter with respect to FIG. 4. If the respective segments of the re-segmented time series data subgraphs 112 are not sufficiently similar (316: NO), then the method 300 can proceed to operation 320.

Operation 320 includes associating a classification 118 of unsuitable for time series modeling 130 to the time series data 102. For example, if the time series data 102 does not exhibit stationarity, periodicity, or trending characteristics, any predictions derived from the time series data 102 will likely be inaccurate or of such low confidence that they are of limited value. Accordingly, classifying time series data 102 as unsuitable for time series modeling 130 can be useful insofar as it prevents the unnecessary usage of computational resources in the training or deployment of a model 106, and it inhibits the deployment of a model 106 that is prone to inaccurate predictions.

Although the method 300 illustrates a particular sequence of iterating through the various segmentation schemes, other sequences are also within the spirit and scope of the present disclosure. Furthermore, in some embodiments, various aspects of the method 300 can be performed concurrently. For example, in some embodiments, operations 302, 308, and 314 can be performed in parallel.

Figure 4:
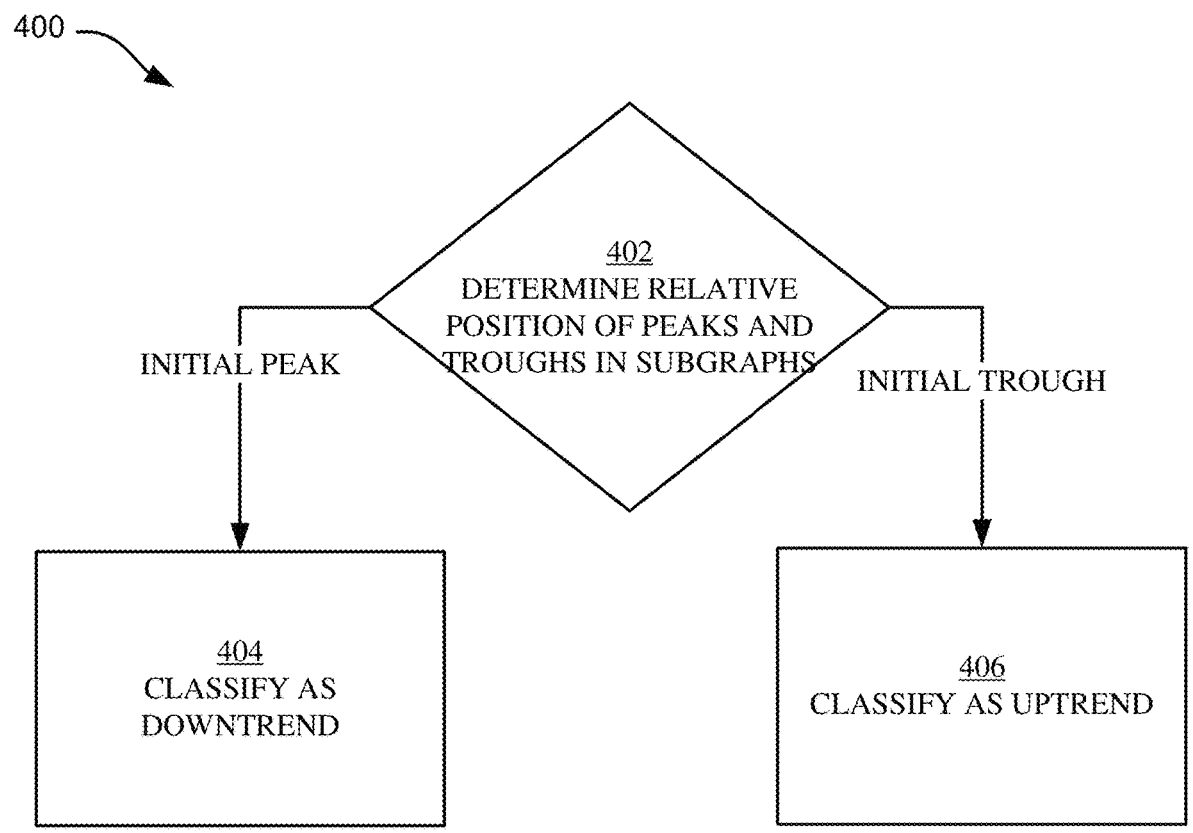
FIG. 4 illustrates a flowchart of an example method for differentiating downtrends from uptrends in time series data with a classification of trending, in accordance with some embodiments of the present disclosure.

FIG. 4 illustrates a flowchart of an example method for differentiating downtrends from uptrends in time series data 102 with a classification 118 of trending 124, in accordance with some embodiments of the present disclosure. In some embodiments, the method 400 is performed by one or more components of a computational environment 100, a computer, a processor, and/or another configuration of hardware and/or software. In some embodiments, the method 400 is a sub-method of operation 318 of FIG. 3.

Operation 402 includes determining a relative position of peaks and troughs in respective time series data subgraphs 112 associated with a classification 118 of trending 124. In some embodiments, operation 402 includes determining if a local maximum value occurs before a local minimum value or vice versa. In some embodiments, operation 402 includes determining if an initial data point (or an average of an initial set of data points) is less than (indicating an initial trough) or greater than (indicating an initial peak) an ending data point (or an average of an ending set of data points).

If operation 402 determines that respective time series data subgraphs 112 include an initial peak, then the method 400 can proceed to operation 404 and classify the time series data 102 as a downtrend 128. Conversely, if operation 402 determines that respective time series data subgraphs 112 include an initial trough, then the method 400 can proceed to operation 406 and classify the time series data 102 as an uptrend 126.

Figure 5A:
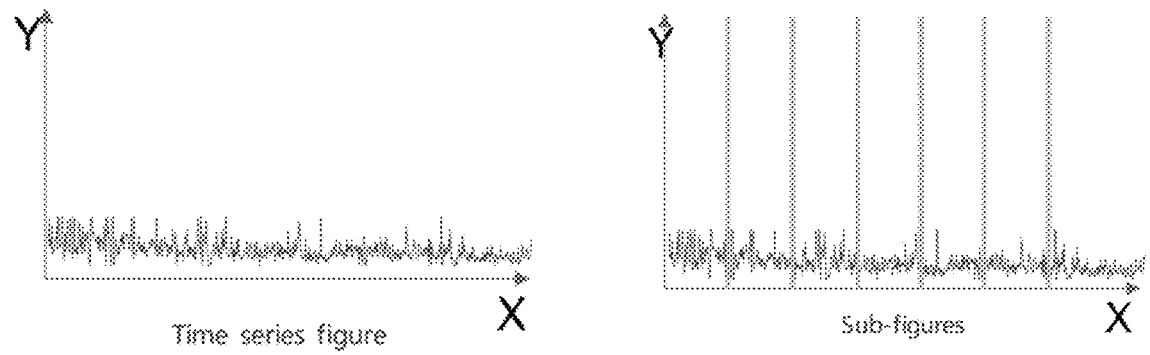
FIG. 5A illustrates graphs of time series data with a classification of stationary and an equidistant segmentation scheme, in accordance with some embodiments of the present disclosure.

FIG. 5A illustrates graphs of time series data 102 associated with a classification 118 of stationary 120, in accordance with some embodiments of the present disclosure. The left graph illustrates a time series data graph 110, and the right graph illustrates time series data subgraphs 112 segmented according to the equidistant segmentation scheme 132. As can be seen, due to the similarity between respective time series data subgraphs 112, the corresponding time series data 102 can be associated with a classification 118 of stationary 120.

Figure 5B:
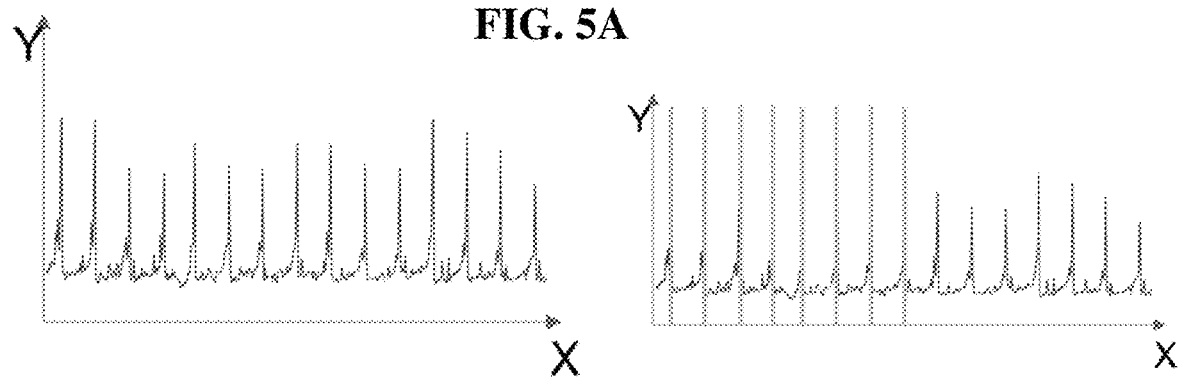
FIG. 5B illustrates graphs of time series data with a classification of periodic and a local extrema segmentation scheme, in accordance with some embodiments of the present disclosure.

FIG. 5B illustrates graphs of time series data 102 associated with a classification 118 of periodic 122, in accordance with some embodiments of the present disclosure. The left graph illustrates a time series data graph 110, and the right graph illustrates time series data subgraphs 112 segmented according to the local extrema segmentation scheme 134. In FIG. 5B, the intervals are approximately equal but smaller in size than the intervals illustrated above with respect to FIG. 5A and defined according to the equidistant segmentation scheme 132. More specifically, the intervals in FIG. 5B are approximately aligned with local maxima values. As can be seen, due to the similarity between respective time series data subgraphs 112, the corresponding time series data 102 can be associated with a classification 118 of stationary 120.

Figure 5C:
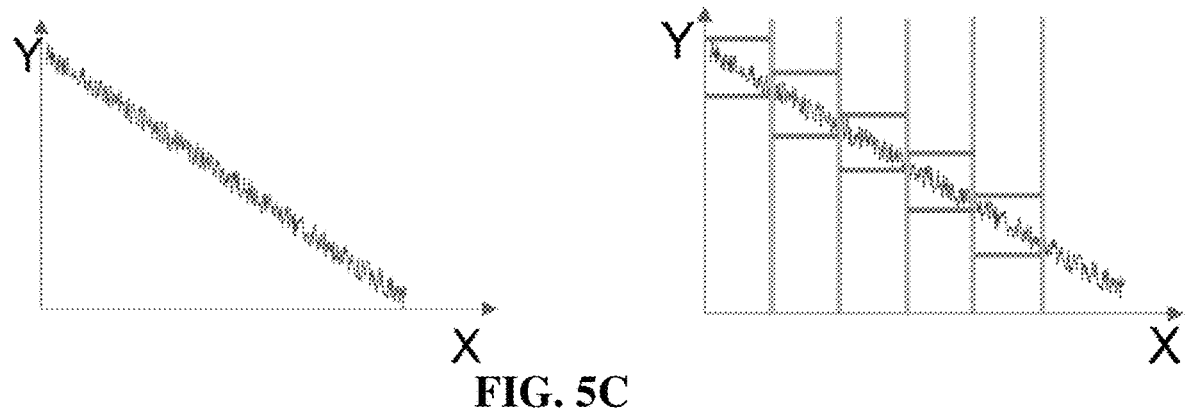
FIG. 5C illustrates graphs of time series data with a classification of trending and a windowed segmentation scheme, in accordance with some embodiments of the present disclosure.

FIG. 5C illustrates graphs of time series data 102 associated with a classification 118 of trending 124, in accordance with some embodiments of the present disclosure. The left graph illustrates a time series data graph 110, and the right graph illustrates time series data subgraphs 112 segmented according to the windowed segmentation scheme 136. As can be seen, due to the similarity between respective time series data subgraphs 112, the corresponding time series data 102 can be associated with a classification 118 of trending 124. Further, in this example, it can be seen that respective windowed time series data subgraphs 112 exhibit an initial peak followed by subsequent troughs. Accordingly, the time series data 102 can be further associated with a classification 118 of downtrend 128.

Figure 5D:
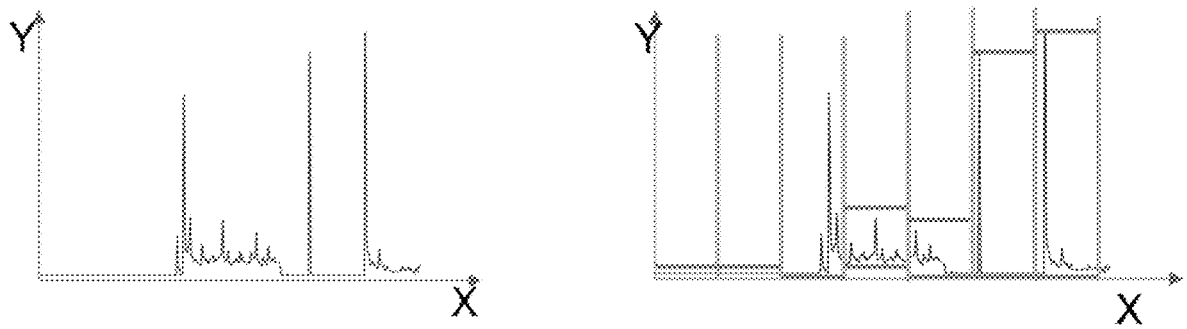
FIG. 5D illustrates graphs of time series data with a classification of unsuitable for time series modeling, in accordance with some embodiments of the present disclosure.

FIG. 5D illustrates graphs of time series data 102 associated with a classification 118 of unsuitable for time series modeling 130, in accordance with some embodiments of the present disclosure. The left graph illustrates a time series data graph 110, and the right graph illustrates the time series data subgraphs 112. As can be seen, regardless of the segmentation scheme used, none of the aforementioned segmentation strategies result in an adequate similarity between respective time series data subgraphs 112. Accordingly, the time series data 102 can be associated with a classification 118 of unsuitable for time series modeling 130.

Figure 6:
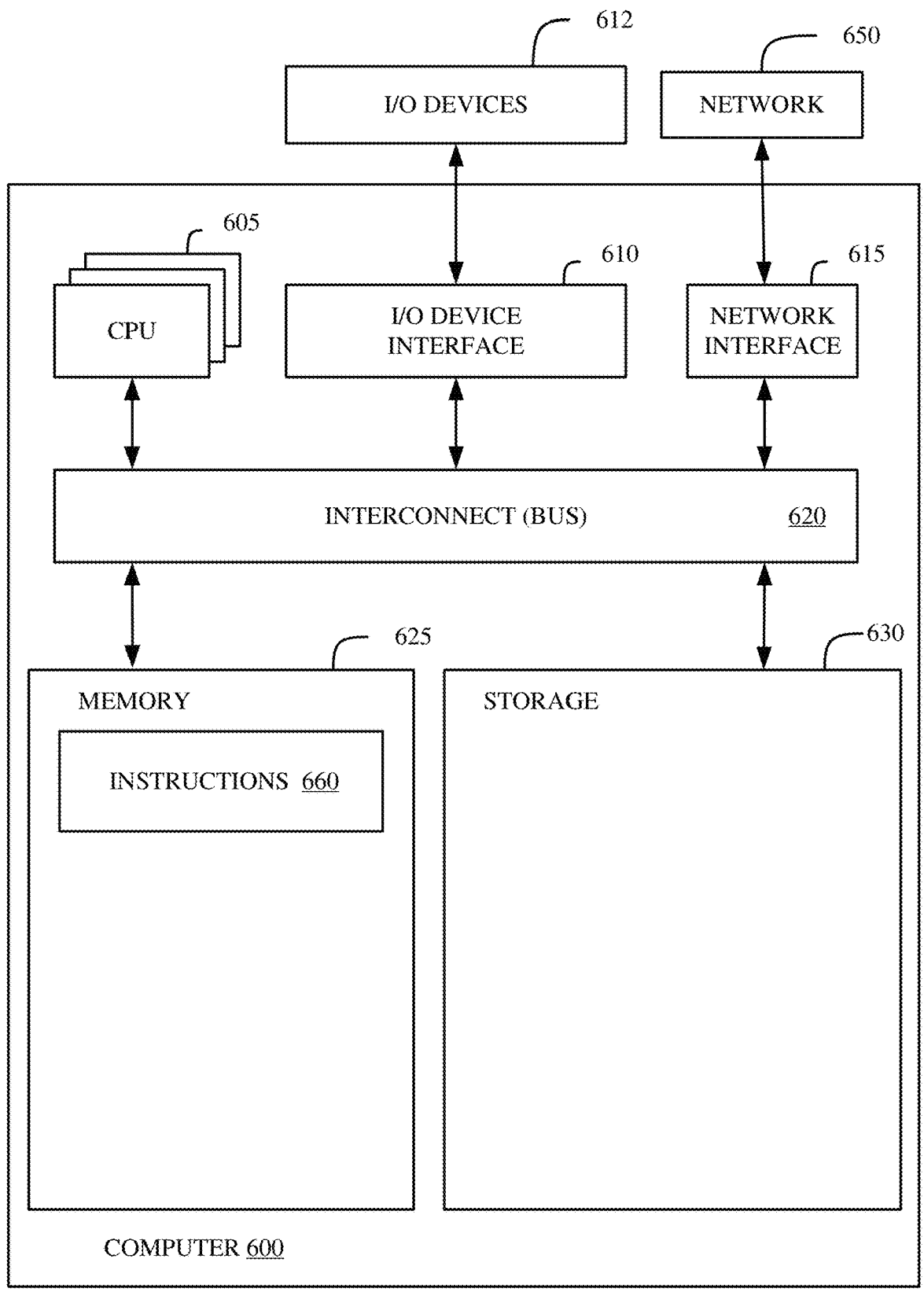
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform any or all of the methods described in FIGS. 2-4 and/or implement the functionality discussed in any one of FIGS. 1 and/or 5. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine such that the client machine executes the method, or a portion of the method, based on the instructions provided by computer 600. In some embodiments, the computer 600 is incorporated into (or functionality similar to computer 600 is virtually provisioned to) the pre-classifier 104 of FIG. 1, other aspects of the computational environment 100 of FIG. 1, or another aspect of the present disclosure.

Computer 600 includes memory 625, storage 630, interconnect 620 (e.g., BUS), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more busses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, the methods of FIGS. 2-4 and/or implement the functionality discussed in FIGS. 1 and/or 5. In some embodiments, instructions 660 can be referred to as a time series data classification protocol, time series data classification instructions, and/or a time series data classification mechanism. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
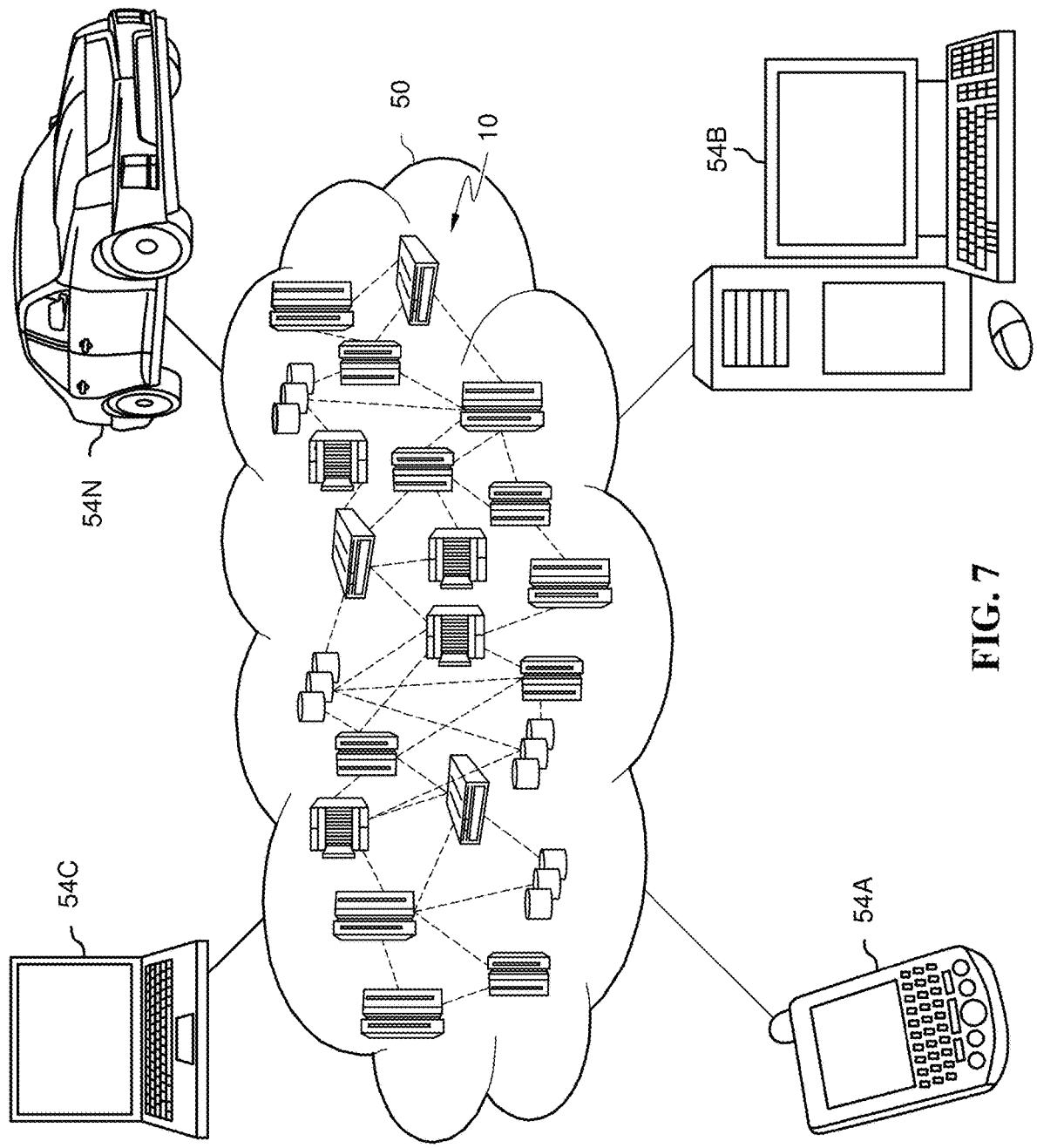
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
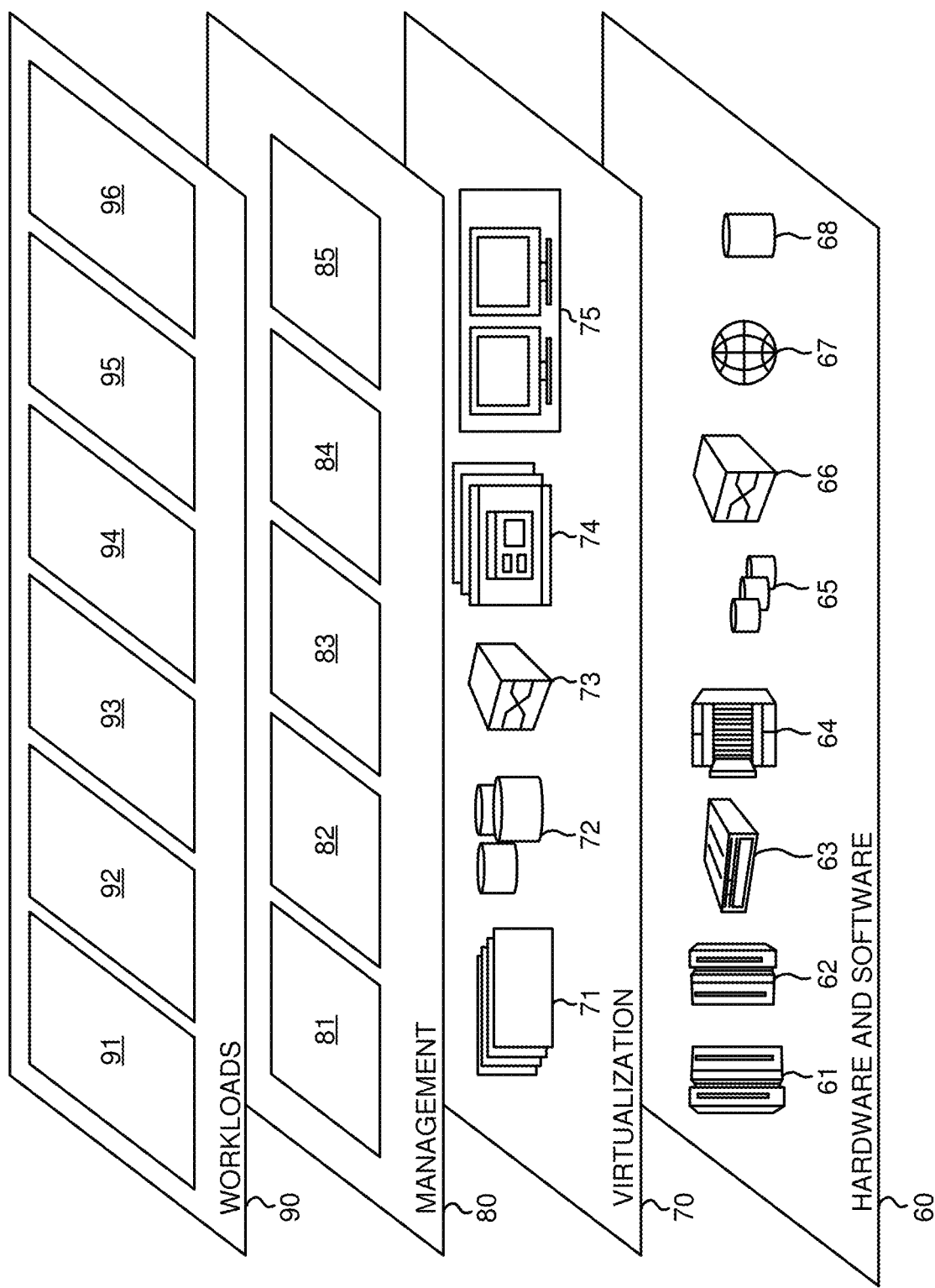
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and time series data classification 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any portion of the method described with respect to FIGS. 2-4 and/or implement any portion of the functionality discussed in FIGS. 1 and/or 5) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes graphing, from time series data, a time series data graph; iteratively segmenting the time series data graph into respective pluralities of subgraphs using respective segmentation schemes until a first plurality of subgraphs generated by a first segmentation scheme exhibits a similarity between respective subgraphs of the first plurality of subgraphs satisfying a similarity threshold, wherein the first segmentation scheme is selected from a first group consisting of: an equidistant segmentation scheme, a local extrema segmentation scheme, and a windowed segmentation scheme; and associating a classification to the time series data based on the first segmentation scheme, wherein the classification is indicative of one selected from a second group consisting of: stationarity of the time series data, periodicity of the time series data, and trending of the time series data.

Example 2 includes the method of example 1, including or excluding optional features. In this example, the first segmentation scheme is the equidistant segmentation scheme, and wherein the classification is indicative of the stationarity of the time series data. Optionally, the equidistant segmentation scheme comprises segmenting the time series data graph at equal temporal intervals.

Example 3 includes the method of example 1, including or excluding optional features. In this example, the first segmentation scheme is the local extrema segmentation scheme, and wherein the classification is indicative of the periodicity of the time series data. Optionally, the local extrema segmentation scheme comprises segmenting the time series data graph at local extrema values.

Example 4 includes the method of example 1, including or excluding optional features. In this example, the first segmentation scheme is the windowed segmentation scheme, and wherein the classification is indicative of the trending of the time series data. Optionally, associating the classification to the time series data further comprises: determining a local maximum occurs before a local minimum in a respective subgraph of the first plurality of subgraphs; and associating a further classification indicative of a downtrend to the time series data. Optionally, associating the classification to the time series data further comprises: determining a local minimum occurs before a local maximum in a respective subgraph of the first plurality of subgraphs; and associating a further classification indicative of an uptrend to the time series data.

Example 5 includes the method of any one of examples 1 to 4, including or excluding optional features. In this example, the similarity between respective subgraphs of the first plurality of subgraphs is based on comparisons between respective image feature vectors the first plurality of subgraphs. Optionally, the similarity is based, at least in part, on a first similarity between a first image feature vector of a first subgraph of the first plurality of subgraphs and a second image feature vector of a second subgraph of the first plurality of subgraphs. Optionally, the first similarity comprises a cosine similarity between the first image feature vector and the second image feature vector.

Example 6 includes the method of any one of examples 1 to 5, including or excluding optional features. In this example, the method further comprises: selecting a model based on the classification; training the model using the time series data; and generating, based on output from the model, a predicted future value of the time series data.

Example 7 includes the method of any one of examples 1 to 6, including or excluding optional features. In this example, the method is performed by a computer according to software that is downloaded to the computer from a remote data processing system. Optionally, the method further comprises: metering a usage of the software; and generating an invoice based on metering the usage.

Example 8 is a system. The system includes one or more processors; and one or more computer-readable storage media storing program instructions which, when executed by the one or more processors, are configured to cause the one or more processors to perform a method according to any one of examples 1 to 8.

Example 9 is a computer program product. The computer program product comprising one or more computer readable storage media, and program instructions collectively stored on the one or more computer readable storage media, the program instructions comprising instructions configured to cause one or more processors to perform a method according to any one of examples 1 to 8.

What is claimed is:

1. A computer-implemented method comprising:
graphing, from time series data, a time series data graph;
iteratively segmenting the time series data graph into respective pluralities of subgraphs using respective segmentation schemes until a first plurality of subgraphs generated by a first segmentation scheme exhibits a similarity between respective subgraphs of the first plurality of subgraphs satisfying a similarity threshold, wherein the respective segmentation schemes comprise an equidistant segmentation scheme, a local extrema segmentation scheme, and a windowed segmentation scheme; and
associating a classification to the time series data based on the first segmentation scheme, wherein the classification is indicative of one selected from a group consisting of: stationarity of the time series data, periodicity of the time series data, and trending of the time series data.

2. The method of claim 1, wherein the first segmentation scheme is the equidistant segmentation scheme, and wherein the classification is indicative of the stationarity of the time series data.

3. The method of claim 2, wherein the equidistant segmentation scheme comprises segmenting the time series data graph at equal temporal intervals.

4. The method of claim 1, wherein the first segmentation scheme is the local extrema segmentation scheme, and wherein the classification is indicative of the periodicity of the time series data.

5. The method of claim 4, wherein the local extrema segmentation scheme comprises segmenting the time series data graph at local extrema values.

6. The method of claim 1, wherein the first segmentation scheme is the windowed segmentation scheme, and wherein the classification is indicative of the trending of the time series data.

7. The method of claim 6, wherein associating the classification to the time series data further comprises:
determining a local maximum occurs before a local minimum in a respective subgraph of the first plurality of subgraphs; and
associating a further classification indicative of a downtrend to the time series data.

8. The method of claim 6, wherein associating the classification to the time series data further comprises:
determining a local minimum occurs before a local maximum in a respective subgraph of the first plurality of subgraphs; and
associating a further classification indicative of an uptrend to the time series data.

9. The method of claim 1, wherein the similarity between respective subgraphs of the first plurality of subgraphs is based on comparisons between respective image feature vectors the first plurality of subgraphs.

10. The method of claim 9, wherein the similarity is based, at least in part, on a first similarity between a first image feature vector of a first subgraph of the first plurality of subgraphs and a second image feature vector of a second subgraph of the first plurality of subgraphs.

11. The method of claim 10, wherein the first similarity comprises a cosine similarity between the first image feature vector and the second image feature vector.

12. The method of claim 1, wherein the method further comprises:
selecting a model based on the classification;
training the model using the time series data; and
generating, based on output from the model, a predicted future value of the time series data.

13. The method of claim 1, wherein the method is performed by a computer according to software that is downloaded to the computer from a remote data processing system.

14. The method of claim 13, wherein the method further comprises:
metering a usage of the software; and
generating an invoice based on metering the usage.

15. A system comprising:
one or more processors; and
one or more computer-readable storage media storing program instructions which, when executed by the one or more processors, are configured to cause the one or more processors to perform a method comprising:
graphing, from time series data, a time series data graph;
iteratively segmenting the time series data graph into respective pluralities of subgraphs using respective segmentation schemes until a first plurality of subgraphs generated by a first segmentation scheme exhibits a similarity between respective subgraphs of the first plurality of subgraphs satisfying a similarity threshold, wherein the respective segmentation schemes comprise an equidistant segmentation scheme, a local extrema segmentation scheme, and a windowed segmentation scheme; and
associating a classification to the time series data based on the first segmentation scheme, wherein the classification is indicative of one selected from a group consisting of: stationarity of the time series data, periodicity of the time series data, and trending of the time series data.

16. The system of claim 15, wherein the first segmentation scheme is the equidistant segmentation scheme, and wherein the classification is indicative of the stationarity of the time series data.

17. The system of claim 15, wherein the first segmentation scheme is the local extrema segmentation scheme, and wherein the classification is indicative of the periodicity of the time series data.

18. The system of claim 15, wherein the first segmentation scheme is the windowed segmentation scheme, and wherein the classification is indicative of the trending of the time series data.

19. The system of claim 15, wherein the similarity is based, at least in part, on a cosine similarity between a first image feature vector of a first subgraph of the first plurality of subgraphs and a second image feature vector of a second subgraph of the first plurality of subgraphs.

20. A computer program product comprising one or more computer readable storage media, and program instructions collectively stored on the one or more computer readable storage media, the program instructions comprising instructions configured to cause one or more processors to perform a method comprising:

graphing, from time series data, a time series data graph;

iteratively segmenting the time series data graph into respective pluralities of subgraphs using respective segmentation schemes until a first plurality of subgraphs generated by a first segmentation scheme exhibits a similarity between respective subgraphs of the first plurality of subgraphs satisfying a similarity threshold, wherein the respective segmentation schemes comprise an equidistant segmentation scheme, a local extrema segmentation scheme, and a windowed segmentation scheme; and associating a classification to the time series data based on the first segmentation scheme, wherein the classification is indicative of one selected from a group consisting of: stationarity of the time series data, periodicity of the time series data, and trending of the time series data.

\* \* \* \* \*